Aug. 14, 1928.

W. E. SLOAN 1,680,812

VALVE

Filed Feb. 12, 1923

Inventor:
William E. Sloan
By Parker & Carter Attys.

Patented Aug. 14, 1928.

1,680,812

UNITED STATES PATENT OFFICE.

WILLIAM E. SLOAN, OF CHICAGO, ILLINOIS.

VALVE.

Application filed February 12, 1923. Serial No. 618,435.

This invention relates to valves and has for its object to provide a new and improved device of this description. The ordinary rotating valve when opened only occasionally sticks in the casing so that it is impossible or exceedingly difficult to open it. This invention has among other objects to provide a rotating valve which will not stick or "freeze" to the casing and which can be easily opened regardless of the interval of time between opening. The invention has other objects which are more particularly pointed out in the accompanying description.

Referring now to the drawings.

Like numerals refer to like parts throughout the several figures.

Figure 1:
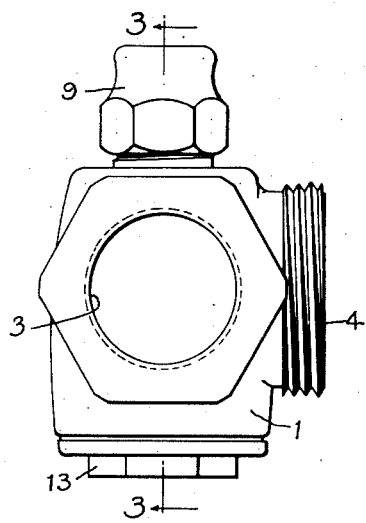
Fig. 1 is a side elevation of one form of valve embodying the invention.
Figure 2:
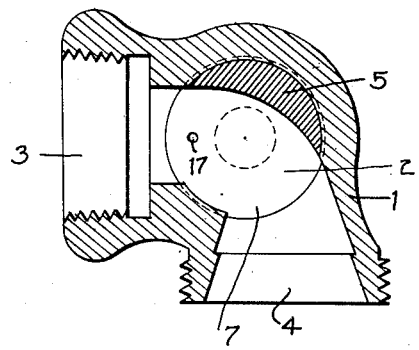
Fig. 2 is a sectional view taken on line 2—2 of Fig. 3.
Figure 3:
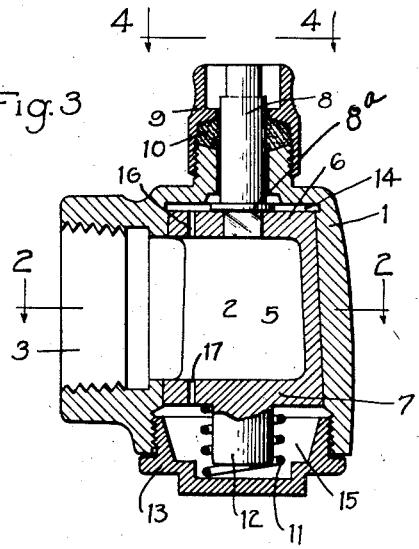
Fig. 3 is a sectional view taken on line 3—3 of Fig. 1.
Figure 4:
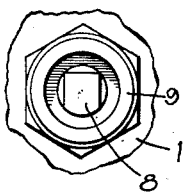
Fig. 4 is a view on line 4—4 of Fig. 3.

In the particular construction shown, there is a valve casing 1 having a passageway 2 therethrough, said passageway having the inlet and outlet 3 and 4. In the construction shown, I have illustrated an angle valve, but the invention is equally applicable to a straight valve. Located within the casing is a closing piece 5 which is connected with the end pieces 6 and 7. The closing piece and the end pieces have tapered or conical shaped surfaces and fit into the tapered or conical shaped seat in the casing 1. Connected with the end piece 6 is a stem 8 which projects through an opening in the casing 1. The lower end of the stem 8 is noncircular and fits into a hole in the end piece 6 but has a loose fit so that any lateral pressure on it tending to force it out of line such as that due to the packing or other parts will not be transmitted to the closing piece 5 and end pieces 6 and 7. If the fit should be tight so that this pressure is transmitted to these parts it would cause binding thereof due to the fact that this valve must have a close fit. In other words, by having the valve so that it lies up independent of the stem this difficulty is obviated. The stem 8 is provided with a shoulder or annular projection $8^a$ which prevents the stem from being blown out by the pressure inside of the valve because of the loose fit of the stem, the part $8^a$ striking the casing so as to limit the movement of the stem. The part $8^a$ also strikes the piece 6 so as to insure the downward movement of the parts 5, 6 and 7. The upper end of the stem 8 is surrounded by a packing cup 9 which is threaded to the casing and which contains the packing 10 surrounding the stem 8. A spring 11 normally tends to keep the valve in proper position with the ends 6 and 7 and piece 5 engaging their seats. I prefer to provide a projection 12 on the end 7 which fits into the spring so as to keep it in proper location. At the bottom of the casing is a removable cap 13 threaded to the casing through which the closing piece is inserted. On the opposite sides of the end pieces I provide spaces 14 and 15 for the water, there being openings 16 and 17 through the end pieces 6 and 7 so that the water can pass into these spaces to equalize the pressure. The stem 8 is provided with some means for turning it. In the construction shown, it is arranged to receive a particular kind of a handle or wrench. In this construction three sides of the end are flat and the other round, as shown in Fig. 4, thus requiring a handle or wrench of this shape to turn the valve. When the valve is closed the closing piece 5 is across the passageway 2. When it is desired to open the valve, it is only necessary to apply a handle or wrench to the stem 8 and press the stem and associated parts inwardly. This moves the end pieces 6 and 7 and the closing piece 5 inwardly so as to release the pressure on the seat and the valve can then be easily turned to move the closing piece into the position shown in Fig. 2 to open the valve. When the pressure is released the spring 11 moves the parts back to their initial position. It will thus be seen that it is not possible for this valve to stick and that regardless of the interval of time between dfferent uses it can be easily and quickly opened by simply pressing it inwardly and rotating it.

In view of the fact that the parts of this device which engage the seats, namely parts 5, 6 and 7, are tapered and fit into a tapered opening, forming the seat, the spring 11 compressing these parts into the tapered opening locks the valve piece in any position in which it may be placed so that the flow of the water does not open it and this permits the passageway to be not only shut off but to be throttled or controlled to any desired amount, the simple releasing of the valve handle causing the spring to move the parts 5, 6 and 7 up into the tapered opening to lock the closing piece in any position in which it may be placed.

I have described in detail a particular construction embodying the invention but it is of course evident that the parts may be varied in many particulars without departing from the spirit of the invention as embodied in the claims hereto attached, and I therefore do not limit myself to the particular construction shown.

I claim:

1. A valve comprising a casing, a single rotating closing piece therein, end pieces connected with said closing piece and having conical shaped faces, said closing piece being eccentric with relation to said end pieces, conical seats for said end pieces and closing piece, the space between said end pieces beyond the closing piece being unobstructed, a stem connected with one end piece centrally thereof, both ends of said stem being noncircular, the end pieces and closing piece adapted to be moved inwardly to be disengaged from their seats so that they can be rotated to open the valve.

2. A valve comprising a casing, a single rotating closing piece therein, end pieces connected with said closing piece and having conical shaped faces, said closing piece being eccentric with relation to said end pieces, conical seats for said end pieces and closing piece, the space between said end pieces beyond the closing piece being unobstructed, a stem connected with one end piece centrally thereof, both ends of said stem being noncircular, the end pieces and closing piece adapted to be moved inwardly to be disengaged from their seats so that they can be rotated to open the valve, and means for moving the end pieces and closing piece back to their seating positions when the inward pressure is released.

3. A valve comprising a casing, a single rotating closing piece therein, end pieces connected with said closing piece and having conical shaped faces, conical seats for said end pieces and closing piece, the space between said end pieces beyond the closing piece being unobstructed, a stem connected with one end piece centrally thereof, both ends of said stem being noncircular, the end pieces and closing piece adapted to be moved inwardly to be disengaged from their seats so that they can be rotated to open the valve, the casing being provided with spaces above and below said end pieces and openings through said end pieces communicating with said spaces to equalize the pressure in said spaces and in the casing.

4. A valve comprising a casing, a rotating, closing piece therein having a tapered face, end pieces connected with said closing piece and having tapered faces, the casing having a tapered opening into which said pieces fit, a stem projecting from said casing and having a loose connection with one of said end pieces, said closing piece and end pieces adapted to be rotated and moved axially by means of said stem, and a projection on said stem adapted to engage the end pieces and, when the pressure in the casing is sufficient, to move said stem to engage said casing and prevent the stem from being disconnected from the end piece.

Signed at Chicago, county of Cook, and State of Illinois, this 28th day of January, 1923.

WILLIAM E. SLOAN.